United States Patent [19]

Mauletti

[11] Patent Number: 5,522,275

[45] Date of Patent: Jun. 4, 1996

[54] INDUSTRIAL ROBOT, PARTICULARLY FOR MOVING PIECES FROM ONE PRESS TO THE OTHER IN A LINE OF PRESSES

[75] Inventor: Enrico Mauletti, Collegno, Italy

[73] Assignee: Comau S.p.A., Grugliasco, Italy

[21] Appl. No.: 358,368

[22] Filed: Dec. 19, 1994

[30] Foreign Application Priority Data

Dec. 17, 1993 [IT] Italy ................... TO93A0961

[51] Int. Cl.⁶ ................................................. B25J 3/02
[52] U.S. Cl. ................... 74/490.03; 74/490.06; 414/744.5; 414/917; 901/15
[58] Field of Search .............. 74/490.01, 490.03, 74/490.06; 414/DIG. 917, 744.5; 901/15, 29

[56] References Cited

U.S. PATENT DOCUMENTS

| | | | |
|---|---|---|---|
| 4,712,971 | 12/1987 | Fyler | 414/744.5 |
| 4,756,662 | 7/1988 | Tanie et al. | |
| 5,107,719 | 4/1992 | Kota | |
| 5,180,955 | 1/1993 | Karidis et al. | 901/29 |
| 5,197,346 | 3/1993 | Zona et al. | 74/490.03 |
| 5,357,824 | 10/1994 | Hashimoto | 74/490.03 |

FOREIGN PATENT DOCUMENTS

| | | |
|---|---|---|
| A0145007 | 6/1985 | European Pat. Off. . |
| 2559411 | 8/1985 | France . |
| 2180572 | 7/1990 | Japan ................... 414/744.5 |
| 1627401A | 2/1991 | U.S.S.R. ................... 414/744.5 |
| A2091836 | 8/1982 | United Kingdom . |
| WO-A9313915 | 7/1993 | WIPO . |

OTHER PUBLICATIONS

Kokkinis et al 'Direct–Drive Robot for Clean Room Assembly', Third IEEE/CHMT International Electronic Manufacturing Technology Symposium, Oct. 12–14, 1987 Anaheim, CA.

Primary Examiner—Charles A. Marmor
Assistant Examiner—David Fenstermacher
Attorney, Agent, or Firm—Sughrue, Mion, Zinn, Macpeak & Seas

[57] ABSTRACT

An industrial robot, particularly for use as an interpress robot, includes a pair of arms rotatable around two axes parallel to and spaced apart from each other, on which there are articulated two forearms. The opposite ends of the forearms are mutually articulated around a common axis and one of these forearms rotatably supports a wrist for rotation around a third axis parallel to said first and second axis.

4 Claims, 5 Drawing Sheets

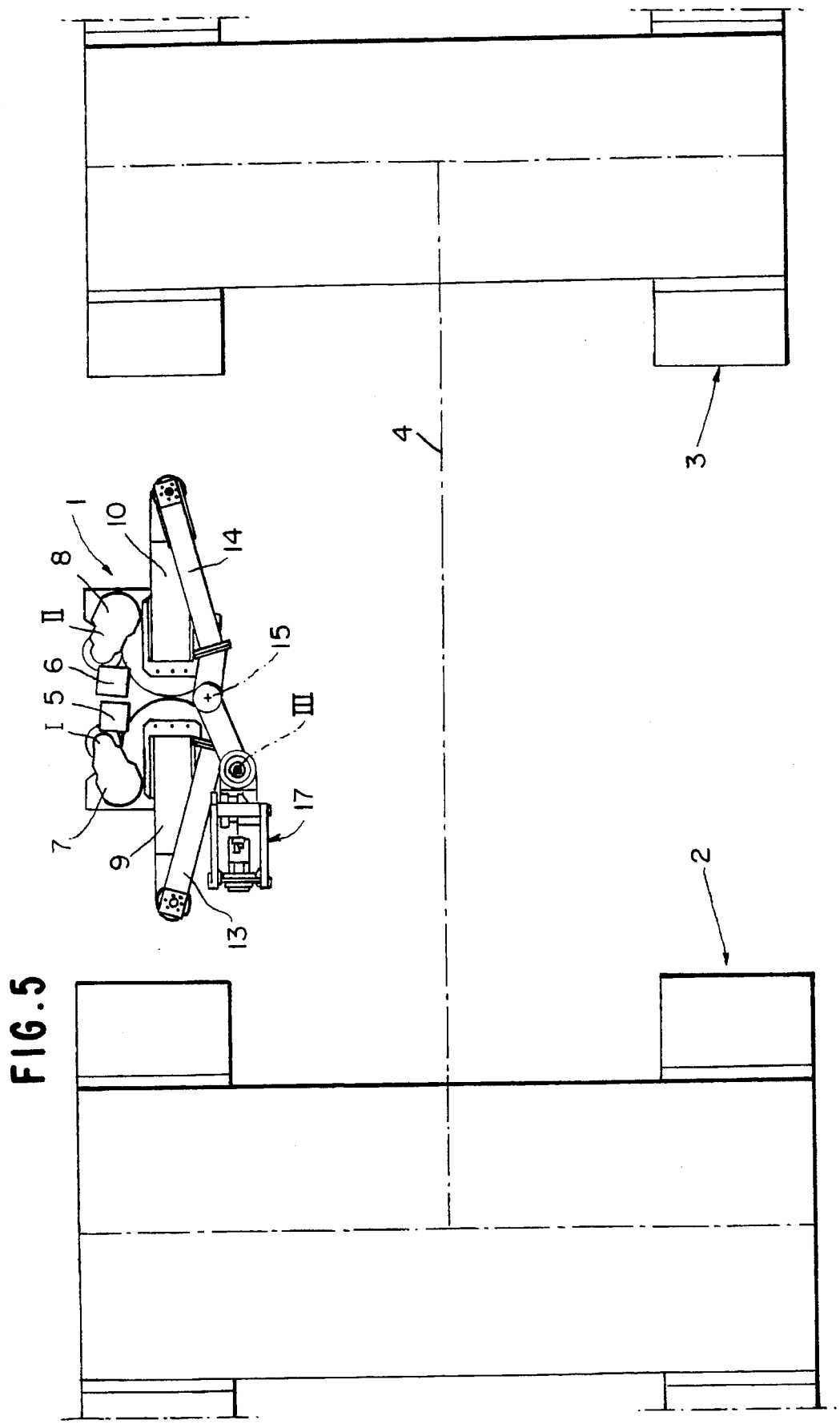

INDUSTRIAL ROBOT, PARTICULARLY FOR MOVING PIECES FROM ONE PRESS TO THE OTHER IN A LINE OF PRESSES

BACKGROUND OF THE INVENTION

The present invention relates to industrial robots, particularly (but not exclusively) for moving pieces from one press to the other in a line of presses.

The applicant has produced and marketed for a long time an industrial robot which may be used for the above mentioned application and known in the market as "Inter-press" robot (see for example U.S. Pat. No. 4,661,040).

SUMMARY OF THE INVENTION

The object of the present invention is that of providing a new robot to be used particularly, but not exclusively, as an inter-press robot which has a simpler and lighter structure, which is faster in operation and is of a relatively inexpensive manufacture.

In order to achieve this object, the invention provides an industrial robot, characterized in that it comprises:

a base, a pair of arms rotatably mounted on the base respectively around a first axis and a second axis parallel to and spaced apart from each other, two motor and reduction gear units for driving rotation of said arms, two forearms respectively articulated at one and to said arms around two axes parallel to said first and second axes, and mutually articulated at their opposite ends around a common axis parallel to said first and second axes, and a robot wrist having a first body rotatably mounted on one of said arms around a third axis parallel to said first and second axes, a further motor and reduction gear unit being provided for driving rotation of said first body around said third axis, and a second body displaceable with respect to said first body substantially along a direction parallel to said third axis.

In a preferred embodiment, said second body is connected to said first body by a parallelogram linkage, including a fourth axis perpendicular to said third axis. Furthermore, a flange is rotatably mounted on said second body around a fifth axis perpendicular to said fourth axis, two motor and reduction gear units being provided for driving the movement of said second body and said flange around said fourth and fifth axes.

The robot according to the invention is characterised by a great flexibility in operation, since by controlling the position and speed of the two arms it is possible to obtain displacement of the piece carried by the robot (as usual, by a gripping tool connected to the flange of the robot wrist) along a predetermined path. Thus, for example, it is possible to obtain a rapid displacement of a piece to be transferred from one press to the subsequent press in a line of presses.

At the same time, the structure of the robot is much simpler with respect for example to the interpress robot previously produced by the applicant (see the above mentioned US Patent). In particular, since the moving masses are very reduced, the structure of the robot may be provided as a very simple and light structure. For example, the arms and the forearms may have a tubular configuration, easy and inexpensive to be manufactured. In the case of use as inter-press robot, the provision of said fifth axis is optional, as it will be come more clearly apparent in the following.

BRIEF DESCRIPTION OF THE DRAWINGS

Further features and advantages of the invention will appear from the following description with reference to the annexed drawings, given purely by way of non limiting example, in which.

DETAILED DESCRIPTION OF THE INVENTION

Figure 1:
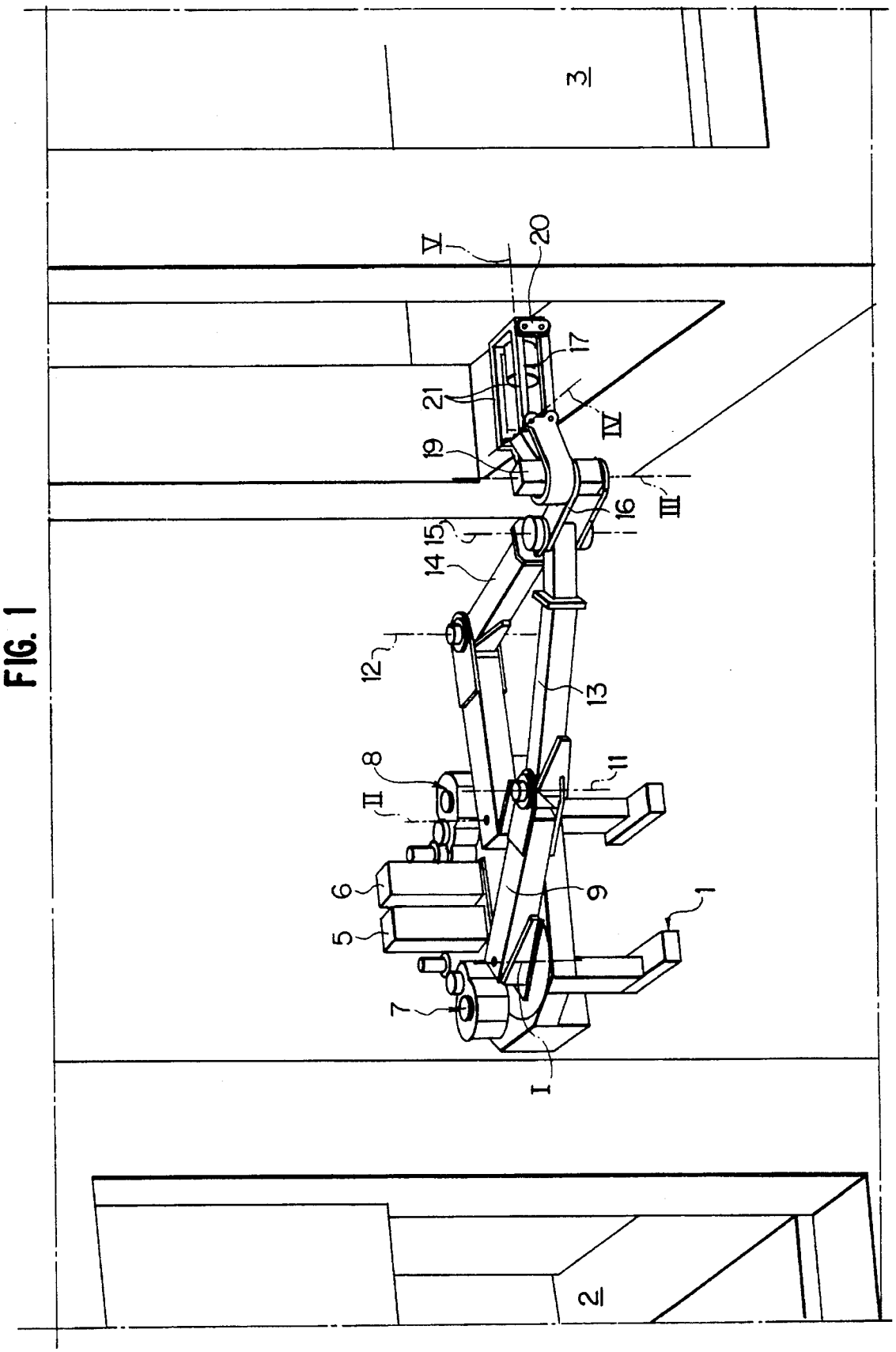
FIG. 1 shows a diagrammatic perspective view of a preferred embodiment of the robot according to the invention.

With reference to the drawings, reference number 1 designates a fixed base arranged in the space between two subsequent presses 2, 3 of a line of presses for example for production of sheet-metal structures for motor-vehicles. Each sheet-metal structure is transferred in sequence from a press to the other of the line of presses in order to undergo in sequence a number of operations by which a product having the desired configuration is obtained. In the space comprised between each pair of subsequent presses 2, 3 on one side with respect to the axis 4 along which the presses are arranged, there is positioned the base 1 of the robot according to the invention. On the base 1 there are mounted two electric motors 5, 6 which drive, by means of reduction gear units 7, 8, the rotation of two arms 9, 10 which are rotatably mounted on the base 1 around a first axis I and a second axis II both vertical in the illustrated example parallel to and spaced apart from each other. The free ends of the two arms 9, 10 rotatably support two forearms 13, 14 around two vertical axes 11, 12. The ends of the two forearms 13, 14 opposite two arms 9, 10 are mutually articulated around a common axis 15 parallel to axes I, II, 11 and 12. As result of the above mentioned kinematic connection, the arrangement of the two forearms 13, 14, and hence of axis 15, is univocally determined by the position of the two arms 9, 10.

The forearm 14 has an extension 16 which is rigidly connected to the structure of forearm 14 and extends beyond axis 15. The free end of the extension 16 rotatably supports a wrist 17 around an axis III parallel to axes I and II and corresponding to the third degree of freedom of the robot according to the invention.

Figure 2:
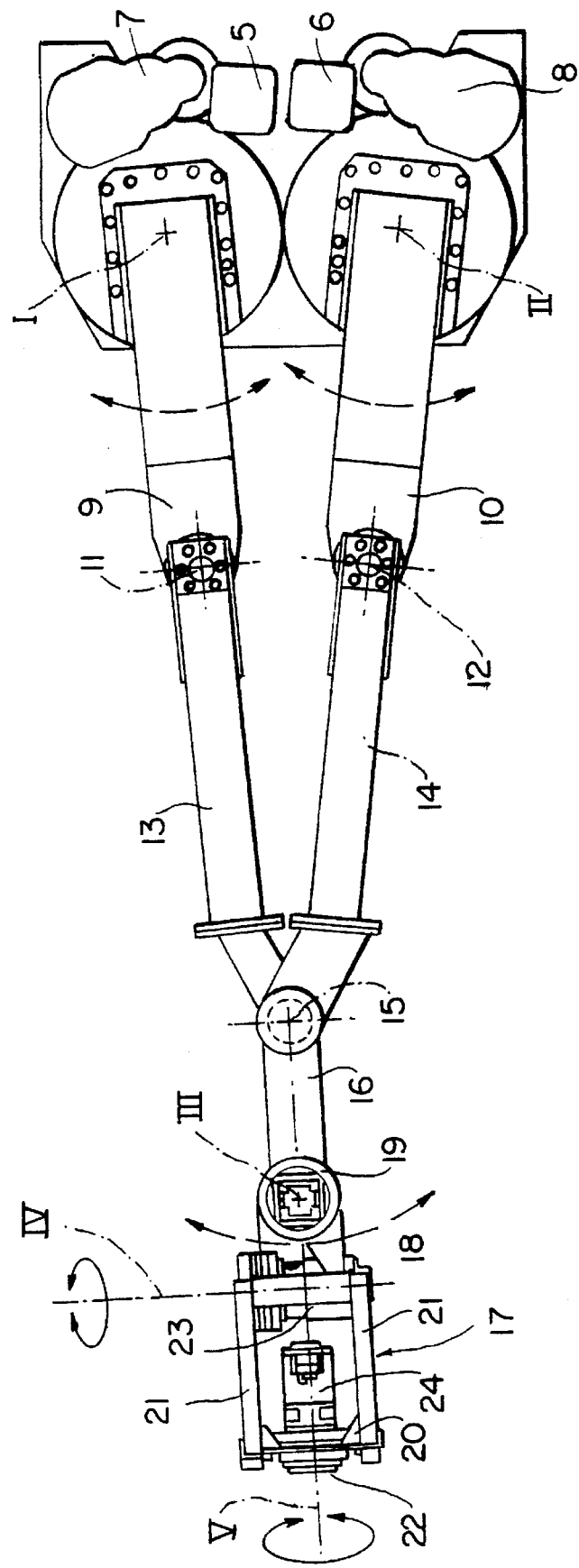
FIG. 2 is a plan view of the robot of FIG. 1 and FIGS. 3, 4, 5 are plan views which show three different conditions of operation of the robot of FIG. 1.

The wrist 17 comprises a first body 18 (FIG. 2) which is rotatably mounted around an axis III on the extension 16 of the forearm 14 and which is provided with a motor and reduction gear unit 19 for driving the rotation around axis III.

The wrist 17 further comprises a second body 20 which is connected to body 18 by a parallelogram linkage including two pairs of levers 21 arranged in two vertical planes on both sides of the axis of extension 16. The upper lever 21 of each pair of levers 21 arranged on each side of this axis is articulated to body 18 around a fourth axis IV which is perpendicular to axis III. Alternatively, the lower lever 21 in one of the two pairs of levers may be eliminated, whereas the two upper levers 21 may be integrated in a single frame.

According to a further preferred (although not essential) feature, the body 20 rotatably supports a flange 22 for rotation around an axis V perpendicular to axis IV. Reference numerals 23, 24 respectively designate two motor and reduction gear units which control rotations around axes IV and V.

In the present description and in the annexed drawings, the details of construction of the electric motors and the reduction gear units which control rotation around axes I, II, III, IV and V of the robot are not shown, since such members may be of any known type and do not fall in themselves within the scope of the present invention. Furthermore, elimination of these details from the drawings renders the latter easier to understand.

According to a well known technique flange 22 is for supporting a gripping member, for example of the type provided with suction cups, which enables a sheet metal piece to be picked up, transferred and deposited.

As it clearly appears from the foregoing description, in operation the rotation around axes I and II is controlled so that a desired movement is obtained of axis III along a predetermined path which is to bring piece 26 (FIGS. 3–5) from a press 2 to a subsequent press 3. During this movement, the rotation around axis III is controlled to arrange piece 26 with a desired orientation when it is loaded on the subsequent press. The rotation around axis IV is controlled to enable a movement of the piece along a substantially vertical direction when it is picked up from the upstream press 2 and when it is unloaded on the downstream press 3 (with reference to the direction of movement of the piece along the line of presses). Finally, the rotation around axis V is controlled in order to obtain small tilting movements or a full overturning of the piece around a horizontal axis as possibly requested by some specific applications.

Figure 3:
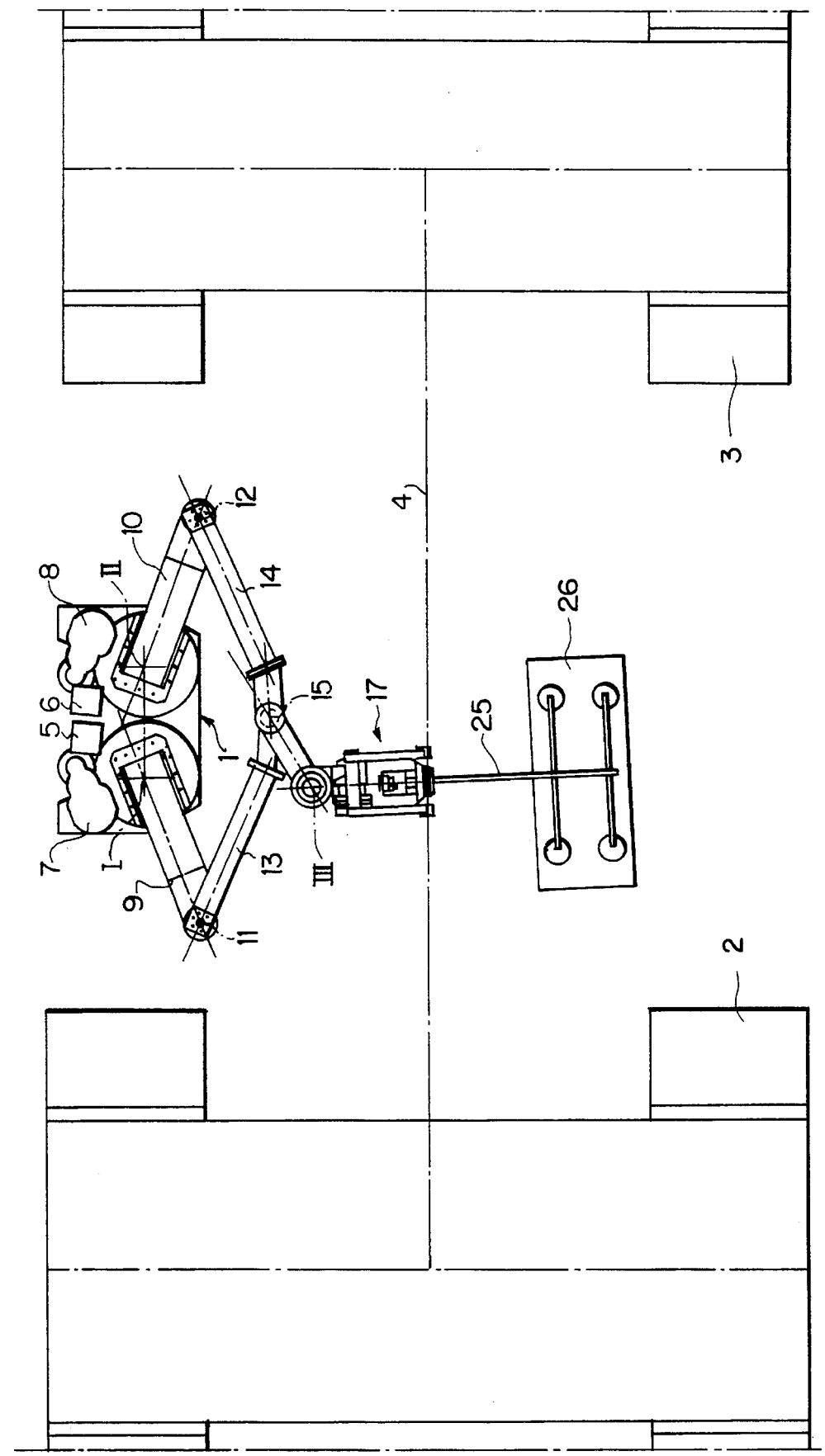
Figure 4:
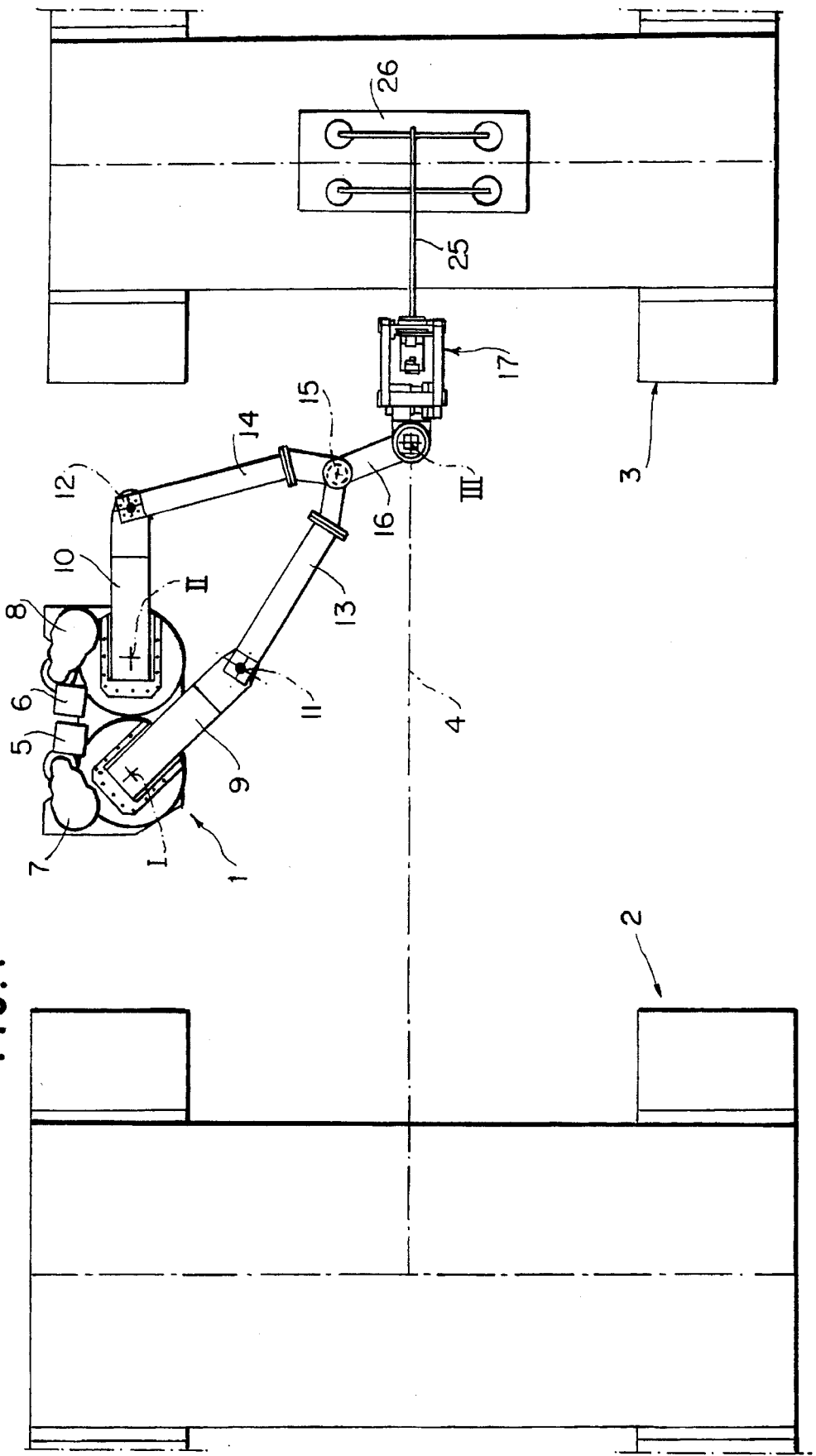

FIGS. 3, 4 of the annexed drawings show the robot in the configuration respectively corresponding to an intermediate position of the piece 26 during its travel from press 2 to press 3 and the final unloading position of piece 26 on press 3.

FIG. 5 shows a rest configuration of the robot, having a minimum bulk.

As indicated already, arms 9, 10 and forearms 13, 14 may have a relatively light structure with tubular configuration, since, differently from the inter-press robot known from the above mentioned US Patent, the moving masses are relatively reduced, which enables advantages of simplicity of construction and rapidity in operation to be obtained.

According to a further feature, it is possible to provide arms 9, 10 and/or forearms 13, 14 with a structure adjustable in length which may be controlled for example by screw-and-nut systems, in order to further increase the flexibility of the robot in operation.

The rotatable mounting of the two arms 9, 10 around two vertical axes I, II which are spaced from each other enables the respective reduction gear units to be supported separately, to the advantage of the strength and reliability of the structure.

Naturally, while the principle of the invention remains the same, the details of construction and the embodiments may widely vary with respect to what has been described and illustrated purely by way of example, without departing from the scope of the present invention.

I claim:

1. An industrial robot for moving pieces from one press to another press in a line of presses, comprising:

a base, a pair of arms rotatably mounted on the base, respectively, around first and second axes parallel to and spaced apart from each other, two motor and reduction gear units for driving rotation of the two arms, two forearms respectively articulated at one of their ends to said arms around two axes parallel to said first and second axes and mutually articulated at their opposite ends around a common axis parallel to said first and second axes, and a wrist having a first body rotatably mounted on one of said forearms around a third axis parallel to said first and second axes, and a wrist having a first body rotatably mounted on one of said forearms around a third axis parallel to said first and second axes, a further reduction gear unit being provided for driving rotation of said first body around said third axis, and a second body displaceable with respect to the first body substantially along a direction parallel to said third axis, wherein said second body of the wrist is connected to the first body by a parallelogram linkage including a fourth articulation axis orthogonal to said third axis.

2. A robot according to claim 1, wherein the parallelogram linkage includes a first upper arm and a first lower arm arranged in a plane parallel to said third axis and a second arm parallel to and spaced apart from said plane and integrated in a single frame with said first upper arm.

3. A robot according to claim 1, wherein said second body of the wrist rotatably supports a flange around a fifth axis orthogonal to said fourth axis.

4. A robot according to claim 1, wherein at least one of said arms and said forearms has a structure adjustable in length.

* * * * *